Figure 1:
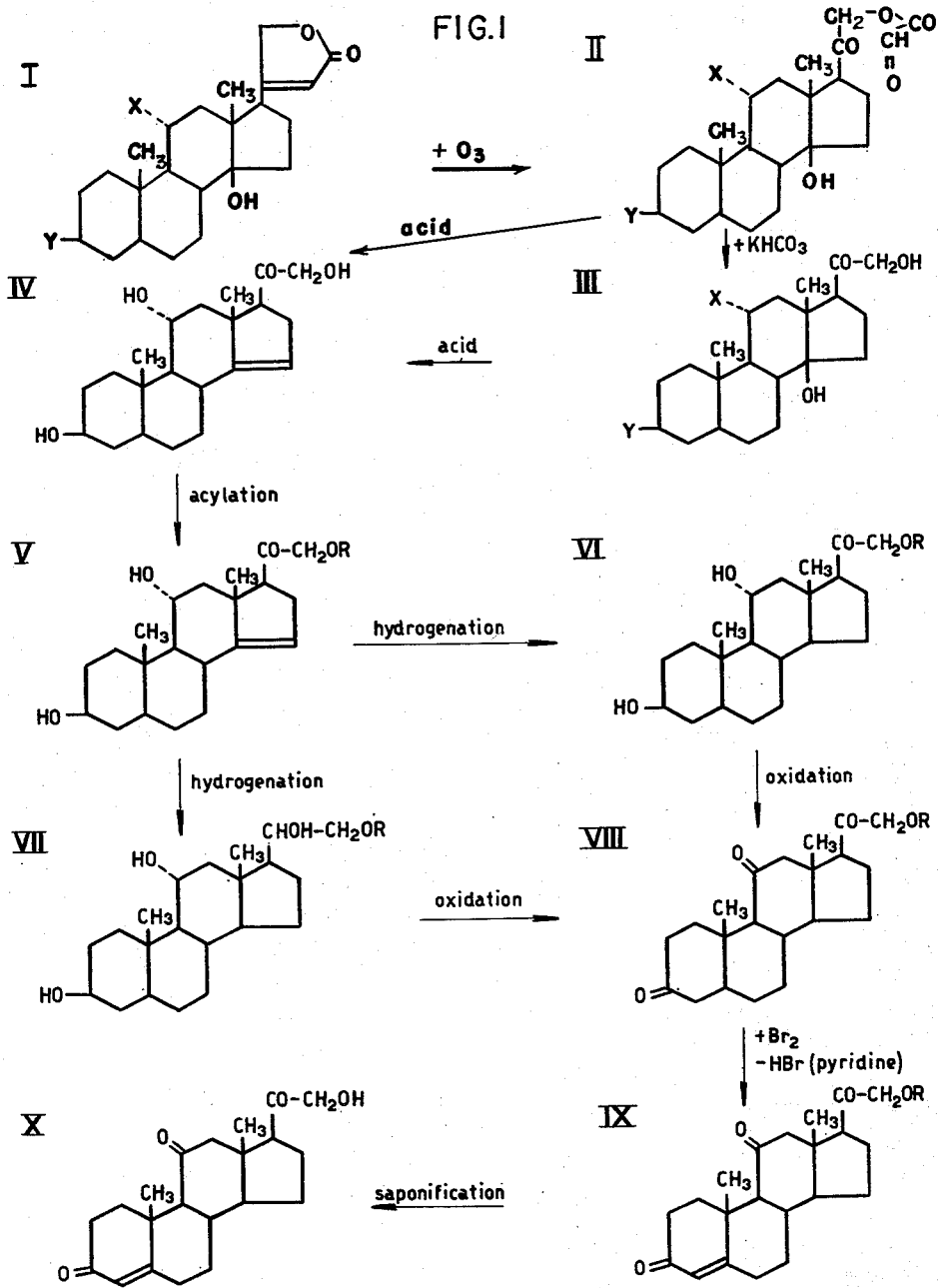

Dec. 4, 1956
T. REICHSTEIN
2,773,076
PROCESS OF PREPARING COMPOUNDS HAVING
ADRENO-CORTICAL HORMONE ACTIVITY
Filed Nov. 5, 1951
3 Sheets-Sheet 3
FIG.3
I 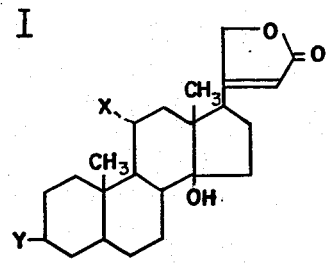
+ozone →
II 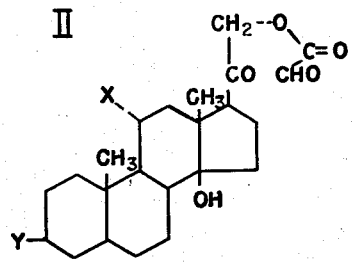
↓ partial saponification
XVI 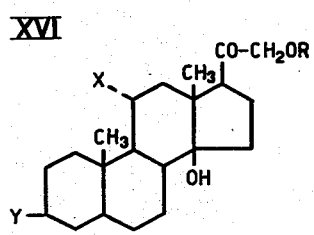
← acylation
III 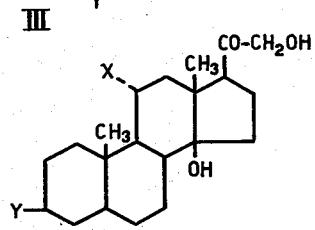
↓ -water
XVII 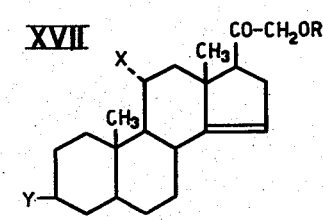
hydrogenation / oxidation →
XVIII 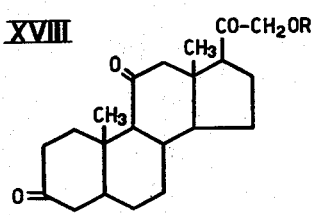
↓
introducing a double bond between
$C_4$ and $C_5$ as in Fig.2
INVENTOR.
Tadeus Reichstein
BY Fred A. Klein
attorney

2,773,076
Patented Dec. 4, 1956

United States Patent Office

2,773,076

PROCESS OF PREPARING COMPOUNDS HAVING ADRENO-CORTICAL HORMONE ACTIVITY

Tadeus Reichstein, Basel, Switzerland, assignor to Organon, Inc., Orange, N. J., a corporation of New Jersey Application November 5, 1951, Serial No. 254,880

Claims priority, application Netherlands September 13, 1947

12 Claims. (Cl. 260—397.45)

This invention relates to a process of preparing compounds having adreno-cortical hormone activity, and more particularly to a process of preparing said compounds from a starting material occurring in nature and having an oxygen linkage preformed at the carbon atom 11, and to products obtained thereby. This application is a continuation-in-part application of my copending application Serial No. 47,052, filed August 31, 1948.

The object of this invention is to produce valuable physiologically active compounds for therapeutic application such as corticosterone, 11-dehydro-corticosterone, 17-hydroxy-corticosterone and 17-hydroxy-11-dehydrocorticosterone and their esters. These compounds are of special value in the treatment of adrenal insufficiencies and the last mentioned compound has proven to be of great value in the treatment of rheumatoid arthritis.

A further object of the invention is to produce such compounds in large quantities by a simple and efficient process, prior processes having proven to be complicated, of lower yield and restricted to use of glandular extracts.

It has been found that dehydro-11-corticosterone or corticosterone or other steroids having an oxygen linkage at the carbon atom 11 can be easily obtained by starting from sarmentogenine, sarmentocymarine or sarnovid which can be secured in a relatively simple way from seeds of certain Strophanthus varieties suitable to that purpose.

These compounds and derivatives therefrom, which are part of this invention, correspond to the following formula:

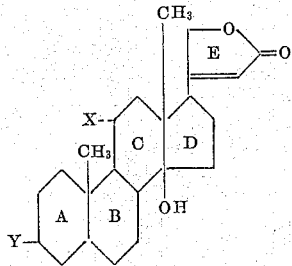

X and Y represent hydroxyl groups, or groups convertible by hydrolysis into hydroxyl groups, such as ester, ether, glycosido groups, or keto groups, or groups convertible by hydrolysis into keto groups, such as oximo, semicarbazono, hydrozino and the like groups, enolic groups and the like. As starting materials, derived from such seed, having the above structure the following are useful and important:

Sarmentogenine (X and Y: hydroxyl),

Sarmentogenine monoesters (X: acyloxy group when Y: hydroxyl, or vice versa), such as sarmentogenine-3-monoacetate, sarmentogenine-3-monopropionate, 3-carbomethoxy sarmentogenine, 3-carboethoxy sarmentogenine, 3-carbobenzoxy sarmentogenine, sarmentogenine-3-n-valerinate, sarmentogenine-11-monoacetate, sarmentogenine-11-monobenzoate.

Sarmentogenine diesters (X and Y: the same or different acyloxy groups, such as sarmentogenine diacetate, diformiate, di-(carbomethoxy) sarmentogenine, di-(carbethoxy) sarmentogenine, di(carbobenzoxy) sermentogenine, sarmentogenine dibenzoate, sarmentogenine di-n-valerianate, 11-carbobenzoxy sarmentogenine-3-acetate, the di-trifluoroacetate.

Sarmentogenine monoethers (X: alkoxy, aryloxy, aralkoxy group when Y: hydroxyl, or vice versa) such as diphenylmethoxy-3-sarmentogenine, triphenyl methoxy-3-sarmentogenine, benzyloxy-3-sarmentogenine.

Sarmentogenine diethers (X and Y: The same or different alkoxy, aryloxy, aralkoxy groups such as di-(diphenyl methoxy) sarmentogenine, di-(triphenyl methoxy) sarmentogenine, di-(methoxy) sarmentogenine, di-(benzyloxy) sarmentogenine.

Sarmentogenine ethers esters (X: acyloxy group when Y: ether group and vice versa), such as sarmentogenine ether esters containing benzyl residues, diphenylmethyl residues, triphenylmethyl residues.

Sarmentogenine glucosides such as sarmentocymarine and sarnovid and derivatives thereof, such as sarmentocymarine-11-monoacetate, sarmentocymarine-11-monobenzoate, sarmentogenine-3-glycoside, sarmentogenine diglycoside, 11-benzyloxy sarmentocymarine acetate, 11-carbobenzoxy sarmentocymarine, 3-glucoside sarmentogenine-11-propionate.

Sarmentogenone (X and Y: keto groups).

Sarmentogenone keto derivatives X and Y the same or different groups obtained on reacting a keto group with a ketone reagent, such as hydrazine, phenylhydrazine, paranitro-phenylhydrazine, dinitro phenylhydrazine, hydroxy amine, semicarbazide, phenyl-semicarbazide, phenyl thiosemicarbazide, thiosemicarbazide, Girard reagent P and T and others.

3-hydroxy-11-keto sarmentogenine-like compounds and their esters, ethers, glycosides, and reaction products with ketone reagents, for instance, 11-keto-sarmentocymarine, 11-keto-sarnovid, 3-keto-11-hydroxy sarmentogenine-like compounds and their esters, ethers, for instance the 3-keto-11-monoacetate, 3-keto-11-monobenzoate, 3-keto-11-monopropionate, 3-keto-11-triphenylmethyl ether.

The process of converting sarmentogenine and its derivatives, and ketone compounds derived therefrom and their derivatives into compounds with adreno-cortical hormone activity comprises the following steps:

1. Opening the double bond in ring E by oxidation to form a glyoxylic acid derivative.

2. Saponifying said glyoxylic acid derivative to produce a keto group at the carbon atom 17.

3. Eliminating the tertiary hydroxyl group at the carbon atom 14 by splitting off water and formation of a double bond in ring D between the carbon atoms 14 and 15.

4. Either before or after splitting off water from the carbon atoms 14 and 15, either the hydroxyl group in $C_{21}$-position or all the hydroxyl groups present at the carbon atoms 3, 11 and 21 are esterified or etherified.

5. The double bond between the carbon atoms 14 and 15 is then hydrogenated to produce in ring D saturated compounds while at the same time keto groups present in the molecular are, at least partly, reduced to hydroxyl groups.

The $\Delta_{14,15}$-unsaturated as well as the saturated compounds obtained thereby represent valuable intermediate products which may be converted into adrenocortical hormones in the following manner.

Said intermediate compounds upon oxidation produce the corresponding triketo compounds. The triketo compounds by reduction to the corresponding hydroxy compounds, partial dehydrogenation of the hydroxyl group at the carbon atom 3, and introduction, by halogenation and splitting off of hydrogen halide, of a double bond between the carbon atoms 4 and 5, yield corticosterone and its 21-esters.

By oxidizing said saturated intermediate compounds and introducing directly a double bond between the carbon atoms 4 and 5, 11-dehydro corticosterone and its 21-esters are produced.

The $\Delta_{14,15}$-unsaturated intermediate compounds are directly oxidized to the triketo compounds whereafter the resulting unsaturated triketo compounds are reduced and partially dehydrogenated to convert the hydroxyl groups at the carbon atoms 3 and 20 into ketone groups. On introducing a double bond between the carbon atoms 4 and 5, by halogenation and splitting off of hydrogen halide, corticosterone and its 21-esters are obtained.

A hydroxyl group may be introduced in 17-position into said saturated intermediate products, for instance, by addition of hydrocyanic acid to the 20-keto group, splitting off water, between the carbon atoms 17 and 20, reacting the resulting $\Delta_{17,20}$-unsaturated compound with osmium tetroxide to introduce a hydroxyl group at the carbon atom 17, oxidizing the osmium tetroxide reaction product to the 3,11,20-triketo-17,21-dihydroxy compound, and introducing a double bond between the carbon atoms 4 and 5 by halogenation and splitting off hydrogen halide. In this manner 17-hydroxy-11-dehydrocorticosterone, or cortisone is obtained.

As is evident herefrom, the $\Delta_{14,15}$-unsaturated as well as the corresponding saturated steroid compounds represent valuable intermediate products for the manufacture of steroid hormones characterized by an oxygen linkage in 11-position.

Ozone has been found to be the best oxidizing agent for carrying out the first step of the process according to this invention, namely to open the double bond in ring E. Splitting up the ozonide may be carried out by means of zinc dust and glacial acetic acid. Simple hydrolysis, however, may also be employed for said splitting up action. When using other oxidizing agents, such as hydrogen peroxide, lead-tetra-acylate, osmium tetra-oxide or organic peracids such as per-acetic acid, perbenzoic acid and the like, the yield is lower than with ozone.

Saponification according to the second step of the process of this invention may be carried out by an agent capable of hydrolizing esters to the corresponding alcohols and acids. Alkaline as well as acid saponifying agents may be used. Thus, to saponify the glyoxylic acid ester obtained in the first step of the process, it may be boiled in alcoholic solution under addition of hydrochloric acid. Very good results are obtained when allowing the esters to stand for several hours in an aqueous-alcoholic solution of potassium bicarbonate at room temperature. Thereby, for instance, acetylated hydroxy groups at the carbon atoms 3 and 11, remain unchanged while the glyoxylic acid ester is saponified.

To split off water from the hydroxyl group at carbon atom 14 and the neighboring methylene group of carbon atom 15, the reaction product is subjected to the action of an agent capable of splitting off water from a tertiary carbinol, such as phosphorus oxychloride, a mineral acid, e. g. hydrochloric acid, a carboxylic acid salt such as silver acetate, potassium acetate and the like. For instance, by heating the saponification product with hydrochloric acid, preferably in alcoholic solution, the $\Delta_{14,15}$-compound is obtained. Treating the glyoxylic acid ester, obtained on ozonisation, with hydrochloric acid causes not only saponification of said glyoxylic acid ester but also formation of the $\Delta_{14,15}$-double bond.

The acylation of the 21-hydroxyl group is carried out either before or after splitting off water from the 14-hydroxyl group. Acetic acid anhydride is utilized as an acylating agent. Other satisfactory acylating agents are acetyl chloride, propionic acid anhydride, benzoyl chloride, trimethyl acetyl chloride. An advantageous method of acylating consists in the reaction of the corresponding carboxylic acid halogenides or anhydrides with the hydroxyl compounds whereby preferably alkaline substances capable of combining with and, thus, eliminating the halogen hydride formed, such as alkali hydroxide, or tertiary bases, such as diethylaniline, pyridine or chinoline, are added to the acylation mixture.

The hydrogenation of the double bond between the carbon atoms 14 and 15 is preferably carried out by catalytic hydrogenation, for instance, with noble metal catalysts, such as platinum and palladium or with catalysts of the nickel and iron group.

The attached drawings illustrate the various steps of the process of this invention. According to said process, for instance, sarmentogenine (Fig. 1, Formula I; X and Y:HO—) or sarmentocymarine (Formula I; X:HO—; Y:cymarosido residue), or their ester and ether derivatives, for instance, sarmentogenine diacetate (Formula I; X and Y: $CH_3.COO$—) or dicarbobenzoxy sarmentogenine (Formula I; X and Y: $C_6H_5CH_2OCOO$—), or sarmentogenone (Formula I; X and Y: O=) are dissolved in a suitable solvent, preferably at temperatures between $-80°$ C. and $-20°$ C., oxygen or air containing ozone is passed through said solution until 1 mol of ozone is absorbed, the ozonide obtained is decomposed, preferably by means of hydrogen in *statu nascendi*. Thereby most probably a glyoxylic acid ester of Formula II is obtained. It is, however, not necessary to isolate said ester in the pure state. The crude reaction product is then either carefully saponified, for instance, by means of potassium carbonate in aqueous methanol or by means of acids, so as to produce the 17-ketol compound of Formula III. By heating said ketone III (or by heating the glyoxylic acid ester II directly) with dilute mineral acids, preferably in alcoholic solution, the unsaturated ketol or Formula IV is obtained. It is unnecessary to isolate said ketol in the pure state but it is further worked up as crude product. By careful acylation, the 21-mono acyl derivative of Formula V is obtained wherein R indicates an acyl residue. Isolation of said acyl derivative is not necessary. It may be hydrogenated, for instance, in glacial acetic acid solution in the presence of platinum as a catalyst. Thereby either the saturated ketone of the Formula VI or the saturated hydroxy compound of the Formula VII or a mixture of both is obtained. Said compounds or their mixture are oxidized, for instance, by means of chromic acid to the corresponding triketo compound of Formula VIII. By bromination and splitting off of hydrogen bromide by means of pyridine, 11-dehydro corticosterone ester of Formula IX is obtained which is saponified to 11-dehydro corticosterone of Formula X.

Figure 2:
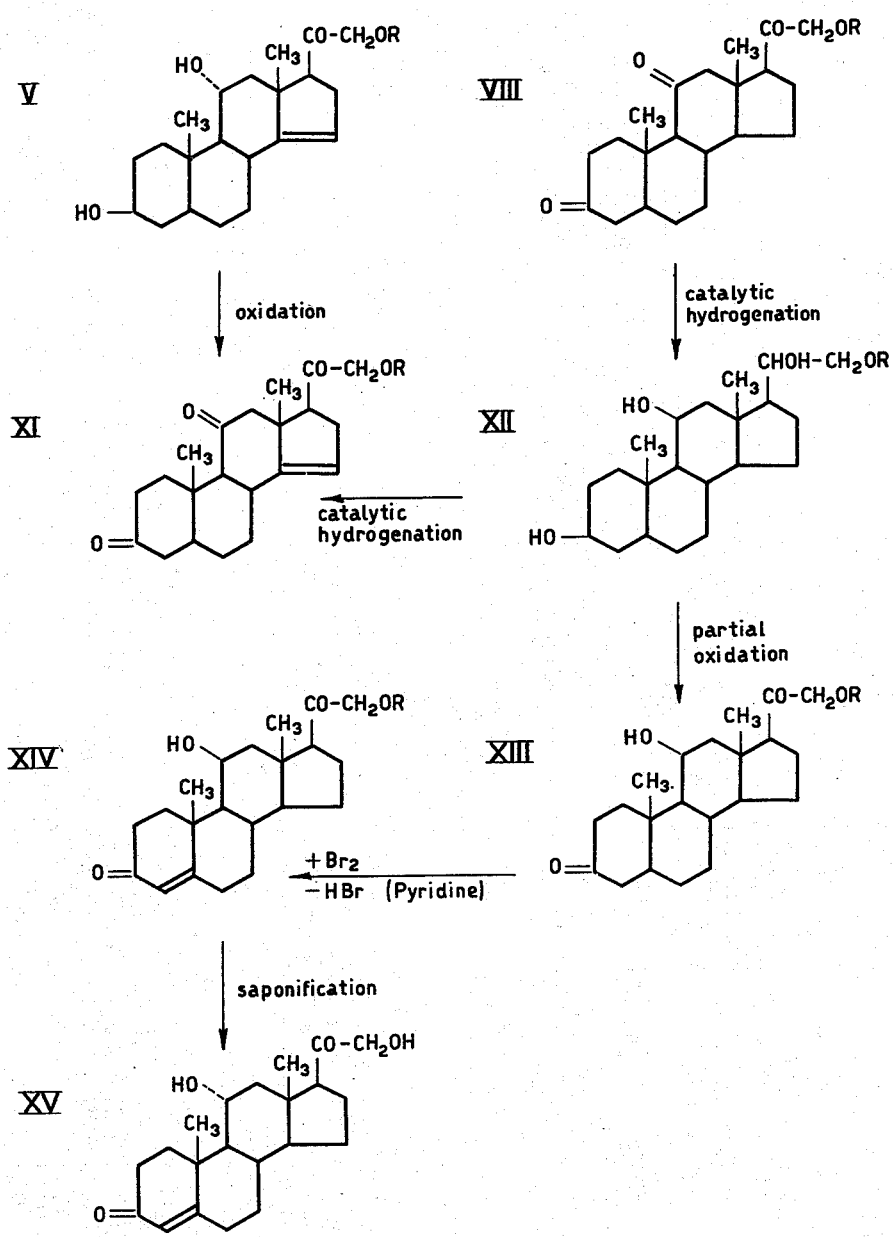

As illustrated in Fig. 2 the unsaturated ketol compound of Formula V may be oxidized, for instance, by means of chromic acid, to the corresponding unsaturated triketo compound of Formula XI which is then hydrogenated to the corresponding saturated 21-monoacylated tetrahydroxy compound of Formula XII, for instance, by catalytically activated hydrogen in the presence of a platinum catalyst. Said compound may also be obtained from the saturated triketo compound of Formula VIII by catalytic hydrogenation in the presence of a platinum catalyst. By partial oxidation, for instance, by means of the Oppenauer method, the 3- and 20-hydroxyl groups are oxidized to keto groups to yield the compound XIII. Said compound in turn may be converted, by introducing a double bond between the carbon atoms 4 and 5, for instance, by bromination and splitting off hydrogen bromide by means of pyridine, into the 21-monoester of corticosterone of Formula XIV which, on saponification, yields corticosterone of Formula XV.

It is not possible to directly convert the compound of Formula VII to corticosterone of Formula XV by oxidizing compound VII following the Oppenauer method. It is necessary to first produce the triketo compound of Formula XI and to reduce the same to the monoacylated tetrahydroxy compound XII. This is most probably due to the fact that in compound VII the hydroxyl group at the carbon atom 11 is attached in α configuration while the hydroxyl group in 11-position in corticosterone of Formula XV is in β configuration.

When starting with sarmentogenone and following the aforesaid procedure the same result is obtained as with sarmentogenine.

Subjecting sarmentocymarine, or its acyl derivatives, to the foregoing procedure, compounds of Formulas III, IV and V are obtained. They may contain, in part, an acyloxy group at the carbon atom 11.

In treating carbomethoxy, carbobenzoxy or the like esters of sarmentogenine, by the foregoing procedure, the ester groups are split off during hydrogenation to compounds VI and VII.

As illustrated in Fig. 3 diesters of sarmentogenine of Formula I, wherein X and Y are acyloxy groups, such as acetoxy, carbomethoxy, benzoyloxy and the like groups are ozonized and split up, for instance, by means of zinc dust in glacial acetic acid, to glyoxylic acid esters of Formula II. By careful saponification, for instance, in methanol with potassium bicarbonate, a ketol diacyl compound of the Formula III is obtained which is then acylated to form a 3,11,21-triacyl compound of Formula XVI wherein R represents an acyl residue, such as the residue of a lower fatty acid like acetyl, propionyl, n-butyryl, trimethyl acetyl residues and the like. Said triacyloxy ketone is, thereafter, subjected to the action of an agent capable of splitting off water such as phosphorus oxychloride in pyridine from the hydroxyl group at the carbon atom 14 and the neighboring methylene group to form the unsaturated triacyloxy ketone XVII. By hydrogenation of compound XVII, for instance, by means of catalytically activated hydrogen in the presence of a platinum catalyst, and subsequent oxidation, for instance, by chromic acid, the saturated triacyloxy compound of Formula XVIII is obtained which may be further worked up into physiologically active adreno-cortical hormones, such as corticosterone, 11-dehydro corticosterone, 17-hydroxy-11-dehydro corticosterone and the like.

It is very surprising that sarmentogenine and compounds derived therefrom can be converted into dehydrocorticosterone, corticosterone, 17-hydroxy-11-dehydro corticosterone and other adreno-cortical hormones having an oxygen linkage at the carbon atom 11.

The following examples illustrate the invention without, however, limiting the same thereto.

*Example 1*

1 g. of sarmentogenine of Formula I (X and Y: OH) having a melting point of 265° C. is brought into hot ethyl acetate till the compound is just dissolved. The solution is rapidly cooled to about −80° C. and about 400 cc. of dry oxygen containing about 4.5% of ozone are introduced and passed through said solution within about 20 minutes. Thereafter the blue-violet reaction solution is allowed to stand for 20 minutes at about −80° C. The blue-violet color should not disappear during this period. Otherwise further amounts of ozonized oxygen are introduced. Special care must be taken that any contamination of the reaction solution, especially with rubber dust is avoided during the ozonization. The ozonized solution is then evaporated to dryness. 10 cc. of glacial acetic acid and 1 g. of zinc dust are gradually added to the residue while shaking vigorously, whereby heat is generated. By cooling from the outside, the temperature is maintained between about 30–35° C. As soon as a drop of the solution, placed on a strip of potassium iodide-starch paper, does not produce any coloration of said paper strip, the solution is filtered, the filtrate is extracted with chloroform, and the chloroform extract is evaporated by vacuum distillation. The residue is dissolved in chloroform, the chloroform solution is washed successively with ice-cold water, with a cold aqueous sodium carbonate solution, and again with a small quantity of ice-cold water, dried over anhydrous sodium sulfate, and then evaporated. 0.91–1.00 g. of a colorless resinous compound are obtained which exert a strong reducing effect upon an alkaline solution of silver diamine. This resin is the glyoxylic acid ester of Formula II (X and Y: HO).

Said ester is dissolved in 20 cc. of ethanol and boiled for ½ hour under reflux after addition of 1 cc. of concentrated hydrochloric acid. 10 cc. of water are added, the alcohol is evaporated by vacuum distillation, the aqueous solution is then heated for 10 minutes at about 70° C., cooled and repeatedly extracted with chloroform. The chloroform extract is washed repeatedly with a potassium bicarbonate solution whereby the temperature is maintained at about 0° C., is then dried, and vacuum-evaporated to dryness. 0.7 g. of a yellowish glassy mass are obtained representing the crude product of Formula IV.

Said crude product is dissolved in 2–3 cc. of water-free dioxane, 0.4 cc. of pyridine are added thereto, the mixture is cooled to about −20° C. and 0.29 cc. of acetic acid anhydride are added while maintaining the temperature at −20° C. The solution is allowed to stand for an hour at about −20° C., thereafter for 16–24 hours at about 0° C. and finally for 1 hour at about 15–20° C. Care must be taken to exclude thereby any moisture. From the reaction mixture there are isolated 0.8 g. of the crude 21-monoacetate of Formula V by evaporation in vacuo at low temperature. Said crude 21-monoacetate is dissolved in 10 cc. of glacial acetic acid of highest purity. To eliminate any substance poisonous to and inactivating the catalyst, said solution is filtered over active carbon which previously had been repeatedly washed with hot water and glacial acetic acid of highest purity. 0.2 g. of platinum oxide are added to the filtered solution and the mixture is shaken in a hydrogen atmosphere until at least as much hydrogen is absorbed as is required for saturating the double bond between the carbon atoms 14 and 15 and for reducing the added platinum oxide catalyst. Thereafter, the hydrogenation mixture is filtered and washed with glacial acetic acid. The hydrogenation products of Formulas VI and VII are not isolated, but to their filtered solution, a solution of 0.4 g. of chromic acid anhydride in 1 cc. of water and 8 cc. of glacial acetic acid is added. The oxidation mixture is allowed to stand for 4 hours at a temperature of 15–20° C. To determine whether the chromic acid is used up, ether, a few drops of dilute sulfuric acid and of a 10% hydrogen peroxide solution are added to a sample of the reaction solution. The presence of free chromic acid is indicated by a blue coloration of the ether. As soon as all chromic acid has been consumed, more chromic acid solution is added to the oxidation mixture until, after allowing the mixture to stand for another 4 hours, a slight excess of chromic acid is detected. The oxidation mixture is then evaporated in a vacuum to a viscous liquid concentrate, 100 cc. of water are added thereto, and the mixture is extracted with a large amount of ether. The ethereal extract is successively washed with dilute sulfuric acid and with dilute sodium carbonate solution, and is dried over anhydrous sodium sulfate. After evaporation of the ether, about 0.65 g. of a colorless mass remain which are dissolved in a mixture of benzene-ligroine. Said solution is passed through a chromatographic column of 20 g. of aluminum oxide, the aluminum oxide is eluted with water-free benzene, and, after distilling off the benzene from said eluate, the residue is recrystallized from a mixture of ether and ligroine. Colorless needles of the melting point 151–153° C. are obtained representing 21-acetoxy pregnanetrione-3,11,20 (Formula VIII). It may be converted into 11-dehydrocorticosterone acetate of Formula IX as described in Helvetica Chimica Acta, vol. 26, page 747 (1943).

Example 2

To produce corticosterone, 0.5 g. of 21-acetoxypregnanetrione-3,11,20 of Formula VIII obtained according to Example 1, are hydrogenated in 10 cc. of glacial acetic acid in the presence of 75 mg. of platinum oxide until 3 mole hydrogen are absorbed and gas absorption ceases. A crude product of the Formula XII is isolated therefrom by filtration from the catalyst and evaporation in vacuo. It is a mixture of isomeric trihydroxy compounds. It is dissolved in 22 cc. of water-free benzene, 4 cc. of acetone and 1.2 g. of pure aluminum phenolate are added thereto, and the mixture is heated at a temperature of about 100° C. for 30 hours. Thereafter, the mixture is diluted with a large amount of ether, the ether solution is repeatedly washed with potassium tartrate solution and subsequently with sodium carbonate solution, is dried and concentrated by evaporation. The phenol is finally removed by careful distillation in a high vacuum. The resulting residue is dissolved in a mixture of benzene and ligroine and the solution is passed through a chromatographic column containing 15 g. of alkali free aluminum oxide. After eluation with a benzene-ether mixture containing up to 50% of ether, evaporating the eluate to dryness, and recrystallizing the residue from ether, colorless needles having a melting point of 155–157° C. are obtained which is the 21-monoacetate of pregnanediol-11,21-dione-3,20 of the Formula XIII. It may be converted into corticosterone of Formula XV as described in Helvetica Chimica Acta, vol. 27, page 1287 (1944).

Example 3

0.4 g. of the neutral crude glyoxylic acid ester of Formula II wherein X and Y are hydroxyl groups, are dissolved in 20 cc. of methanol. A cold solution of 0.4 g of potassium bicarbonate in 10 cc. of water is added thereto and the mixture is allowed to stand for 16 hours at 15–20° C. Methanol is then distilled off in a vacuum, the residue is repeatedly extracted, each time with 50 cc. of chloroform, and the combined chloroform solutions are dried. After evaporating the chloroform under reduced pressure, pregnanetetrol-3,11,14,21-one-20 of the Formula III is obtained in which Formula X and Y are hyroxyl groups. On recrystallization from acetone, a purified product is obtained which, however, does not show a sharp melting point and can be worked up in the crude state to corticosterone and the like compounds are described, for instance, in Examples 1 and 2.

Example 4

1 g. of sarmentocymarine (Formula I; Y: cymaroside residue, X: OH) is dissolved in 10 cc. of chloroform and 5 cc. of water-free pyridine. The solution is cooled to 0° C. and 2 g. of chloroformic acid benzyl ester are added drop by drop thereto. The mixture is allowed to stand for 5 hours and is then decomposed by the addition of ice. The extract obtained on shaking said decomposed mixture with a mixture of chloroform and ether (4 parts of chloroform and 1 part of ether), is repeatedly washed with ice cold dilute hydrochloric acid and subsequently with sodium carbonate solution, is dried over anhydrous sodium sulfate and evaporated to dryness. 1.8 g. of a crude carbobenzoxy sarmentocymarine (Formula I: Y: cymarosido residue; X: carbobenzoxy residue) are obtained. This compound is ozonized and subsequently worked up as described in Examples 1 and 2, yielding the same substances.

Example 5

Dicarbobenzoxy sarmentogenine of the Formula I, wherein X and Y are carbobenzoxy residues, is prepared in the same manner as described in Example 4. This compound is ozonized and subsequently worked up as described in Examples 1 and 2, yielding the same substances.

Example 6

0.2 g. of sarmentogenine of the Formula I (X and Y: OH), 1 cc. of water-free pyridine and 0.8 cc. of acetic acid anhydride are allowed to stand for 16 hours at 20° C. and for 2 hours at 60° C. The product is worked up by evaporation in vacuo at ±40° C. 0.255 g. of a crude sarmentogenine diacetate (Formula I; X and Y: acetoxy groups) are obtained. This product is dissolved in ethyl acetate ad is ionized at −80° C. and the resulting ozonide is decomposed by reduction with zinc dust and glacial acetic acid as described in Example 1. 0.256 g. of crude glyoxylic acid ester of Formula II (X and Y: acetoxy groups) are obtained.

The crude glyoxylic acid ester is dissolved in 20 cc. of methanol, said solution is added to a solution of 0.25 g. of potassium bicarbonate in 6 cc. of water and the saponification mixture is allowed to stand for 16 hours at 20° C. On working up the saponification mixture as described in Example 1, 0.228 g. of the crude ketol compound of Formula III (X and Y: acetoxy groups) are obtained.

The crude ketol is allowed to stand in 1 cc. of water-free pyridine and 0.8 cc. of acetic acid anhydride at 60° C. for 5 hours. Working up said acetylating mixture as described in Example 1 yields 0.252 g. of the crude triacetate of Formula XVI (X, Y and R: acetoxy groups).

The crude triacetate is dissolved in 3 cc. of water-free pyridine, 0.6 cc. of phosphorus oxychloride and 0.01 g. of water are added and the mixture is heated in a closed container to 70° C. for 60 hours. On working up the reaction mixture, as described in Example 1, 0.18 g. of a neutral crude $\Delta_{14,15}$-unsaturated triacetate is obtained. It is dissolved in benzene and filtered through a little aluminum oxide. Yield on evaporation of the benzene: 0.174 g. of the unsaturated compound of Formula XVIII (X, Y and R: acetoxy groups).

Said compound XVIII is dissolved in 5 cc. of glacial acetic acid and is hydrogenated in the presence of 0.04 g. of platinum oxide ($PtO_2.H_2O$) as 20° C. for 1½ hours. About 32 cc. of hydrogen are absorbed, of which about 7.9 cc. are used for reducing the platinum oxide. The hydrogenation mixture is filtered, washed with glacial acetic acid, 1.5 cc. of a 2% chromium trioxide solution in glacial acetic acid are added to the filtrate, and the oxidation mixture is allowed to stand at 20° C. for 16 hours. On working up the oxidation mixture as described in Example 1, 0.167 g. of a crude oxidation product are obtained. On recrystallization from a mixture of ether and petrol ether 0.077 g. of crystals having a melting point of 177–181° C. are isolated. The mother liquor is passed through a chromatographic column of 3 g. of aluminum oxide. On eluting the aluminum oxide with water-free benzene and evaporating the eluate to dryness, further 5 mg. of crystals having the same melting point, are obtained. Total yield: 0.082 g. corresponding to 33. 6% calculated from sarmentogenine triacetate. The 3,11,20-trion-21-acetate of Formula XVIII (X, Y and R: acetoxy groups) is identical with a compound prepared from 3,11-diacetoxy etiocholenic acid by way of the chloride and diazo ketone as is proven by determining the melting point of a mixture of said two compounds. The compound XVIII crystallizes from a mixture of ether and petrol ether in colorless prisms, melting point: 178–181° C., $(\alpha)_D^{18}: +60.2° \pm 2°$ (c.:1.393 in chloroform).

Example 7

Instead of sarmentogenine diacetate according to Example 6, the di-carbethoxy sarmentogenine is used as starting material and a di-carbethoxy-21-acetoxy compound is obtained.

Example 8

Instead of sarmentogenine diacetate according to Example 6, di-carbomethoxy sarmentogenine is used as starting material and a di-carbomethoxy-21-acetoxy compound is obtained.

Example 9

Instead of sarmentogenine diacetate according to Example 6, sarmentogenine diformiate is used as starting material and the triformiate or the diformiate-21-acetate compound is obtained.

Example 10

Instead of sarmentogenine according to Example 1 sarmentogenone is used as starting material. In this case the esterification process of Example 1 leads directly to the triketo-21-acetate of Formula XI.

Example 11

The reaction is carried out as described in Example 1, except that the acylation of compound IV to compound V is carried out with propionic acid anhydride.

Example 12

The reaction is carried out as described in Example 1, except that compound IV is acylated to compound V by means of n-valeric acid chloride.

Example 13

The reaction is carried out as described in Example 4, except that sarmentocymarine is acylated with benzoyl chloride to the corresponding 11-benzoate of sarmentocymarine.

Example 14

The reaction is carried out as described in Example 4, except that sarmentocymarine is etherified with triphenyl methyl halogenide to the corresponding 11-triphenyl methyl ether of sarmentocymarine.

Example 15

Sarmentogenine dimethyl ether is used, instead of sarmentogenine diacetate, as starting material in Example 6. The corresponding dimethoxy-21-acetoxy compound is obtained thereby.

Example 16

A monoketo derivative of sarmentogenone, obtained by reacting the same with Girard reagent is used as starting material, instead of sarmentocymarine, and the reaction is carried out in a similar manner as described in Example 4.

Example 17

Sarmentogenine-3-monoglucoside is used as starting material instead of sarmentocymarine and is reacted as described in Example 4.

Example 18

Instead of ozone, sarmentogenine is treated with hydrogen peroxide or with organic peracids and the reaction product, after hydrolysis, is then split up by means of lead tetra acetate. The reaction product obtained thereby is then worked up as described in Example 1.

Example 19

2.07 g. of sarmentocymarine (M. P. 212–214° C.) are dissolved in 50 cc. of methanol. The solution is mixed with 50 cc. of n/10 sulfuric acid and the mixture is boiled on the water-bath under reflux for 30 minutes. The methanol is then evaporated in a vacuum, whereby sarmentogenine precipitates. The precipitate is filtered, washed with water, and dried in a vacuum. Yield: 1.63 g. of crystalline sarmentogenine having a melting point of 250–270° C. The filtrate is extracted with chloroform and acetic acid ethyl ester yielding, on evaporation of the solvents, further 40 mg. of crude sarmentogenine.

1.3 g. of sarmentogenine (M. P. 250–270° C.) are dissolved in 6 cc. of pyridine. The solution is mixed with 4 cc. of acetic acid anhydride and the mixture is allowed to stand overnight at −80° C. and thereafter for 2 hours at 60° C.

From the reaction mixture there are isolated 1.64 g. of the crude acetate which, on recrystallization from acetone-ether, yields crystals having a melting point of 145–165° C.

1.54 g. of said crude acetate are dissolved in 50 cc. of neutral acetic acid ethyl ester. Into said solution there is introduced dry oxygen containing about 4% of ozone at a rate of about 100 cc. of oxygen per minute and at a temperature of −80° C. After 30 minutes ozonisation is discontinued and the ozonized solution is allowed to stand for further 20 minutes at −80° C. It is then evaporated in a vacuum at 30° C. The residue is dissolved in 6 cc. of glacial acetic acid and the solution is shaken at 20–30° C. for about 1 hour. During this time small portions of zinc dust are added to the solution. The reaction mixture is filtered, the residue on the filter is washed with ether and the filtrate is evaporated to dryness in a vacuum. The evaporation residue is then dissolved in chloroform, the chloroform solution is washed successively with ice-cold water, with a cold aqueous sodium carbonate solution, and again with a small quantity of ice-cold water, is dried over anhydrous sodium sulfate, and is then evaporated to dryness.

1.58 g. of the crude glyoxylic acid ester are obtained. They are purified by dissolving them in 100 cc. of methanol. Said solution is mixed with 1.2 g. of potassium bicarbonate, dissolved in 35 cc. of water, and is allowed to stand for 16 hours. Thereupon the methanol is evaporated in a vacuum and the residue dissolved in ether. On evaporating the ethereal solutions, after washing the same with water and drying them over anhydrous sodium sulfate, 1.39 g. of the crude $3\beta,11\alpha,14,21$-tetrahydroxy-14-isopregnanone-20-diacetate-3,11 are obtained.

225 mg. of said crude diacetate are allowed to stand in 1.5 cc. of pyridine and 1 cc. of acetic acid anhydride at 18° C. for 4 hours and thereafter at 60° C. for 3 hours.

From the reaction mixture there are isolated 252 mg. of the crude corresponding triacetate.

Said 252 mg. of crude triacetate are dissolved in 3 cc. of pyridine. The solution is mixed with 0.6 cc. of phosphorous oxychloride and a trace of water and is then allowed to stand at 70° C. for 16 hours. Thereupon it is mixed with ice and shaken with ether.

On evaporating the ethereal solution, after washing the same with water and drying it over anhydrous sodium sulfate 174 mg. of a clear syrupy $3\beta,11\alpha,21$-triacetoxyprenen-14,15-one-20 are obtained. This product gives a positive reaction with tetranitromethane.

This triacetate is dissolved in 5 cc. of glacial acetic acid and 40 mg. of platinum dioxide catalyst ($PtO_2H_2O$) are added. Hydrogen is passed through said solution while shaking the same. After 1½ hours, 32 cc. of hydrogen are absorbed (7.3 cc. for hydrogenating the catalyst, 9.4 cc. for hydrogenating the one double bond). The platinum catalyst is then filtered off and thoroughly washed with a mixture of $CHCl_3$ and ether. The filtrate and wash solvents are evaporated to dryness. The residue is dissolved in 2 cc. of glacial acetic acid, the solution is mixed with 1.5 cc. of a 2% chromium trioxide solution and the reaction mixture is allowed to stand at 18° C. for 16 hours.

From the reaction mixture there are isolated 163 mg. of a crude product which, on recrystallisation from ether-petroleum ether, yield 77 mg. of crystals of $3\beta,11\alpha,21$-triacetoxypregnanone-20 (prisms), having a melting point of 177–181° C. The mother liquors are passed through a chromatographic column of 3 g. of aluminum oxide. Thereby 5 mg. of crystalline $3\beta,11\alpha,21$-triacetoxypregnan-one-20, having a melting point of 178-181° C., are obtained.

Example 20

1.04 g. of sarmentogenine are dissolved in 12 cc. of pyridine. The solution is mixed with 2 cc. of benzoyl chloride at 0° C. and the reaction mixture is allowed to stand for 5 hours at this temperature. Thereafter methanol is added, the mixture is allowed to stand for 30 minutes and is then evaporated to dryness in a vacuum. The residue is dissolved in chloroform, the chloroform solution is washed to neutral reaction, dried over anhydrous sodium sulfate and is evaporated to dryness. The residue is dissolved in a mixture of chloroform and ether and yields 1.42 g. of sarmentogenine dibenzoate having a melting point of 280–285° C.

Said 1.42 g. of sarmentogenine dibenzoate are dissolved in 100 cc. of acetic acid ethyl ester. The solution is cooled to −80° C. and is ozonised twice for 20 minutes according to the method described in Example 19. Thereafter the solvent is distilled off in a vacuum. The evaporation residue is dissolved in glacial acetic acid.

Thereupon zinc dust is added to the solution in the manner described in Example 1 in order to split the ozonised product.

1.54 g. of the crude glyoxylic acid ester are obtained. The crude product is dissolved in 150 cc. of methanol, a solution of 1.2 g. of potassium bicarbonate in 50 cc. of water is added thereto and the mixture is allowed to stand for 48 hours. The methanol is then distilled off in a vacuum, the precipitated crystals are filtered off and washed with water. 1.34 g. of $3\beta,11\alpha,14,21$-tetrahydroxy-14-isopregnanone-20-dibenzoate-3-11, having a melting point of 190–198° C. are obtained. The filtrate is extracted with chloroform. Thereby an additional amount of 40 mg. of a crude dibenzoate is recovered.

On recrystallisation of the crude dibenzoate from a mixture of acetone and ether a pure dibenzoate is obtained in granular form which melts at 200–203° C. Its specific rotation is $[\alpha]_D^{16}: +3.5° \pm 2°$ (c.: 1.109 in CHCl$_3$)

1.38 g. of the crude dibenzoate (M. P. 190–198° C.) are dissolved in 5 cc. of pyridine and 4 cc. of acetic acid anhydride. The reaction mixture is allowed to stand at room temperature over night.

From this mixture there are isolated 1.51 g. of crude dibenzoate acetate. On repeated recrystallisation from methanol and thereafter from a mixture of ether and methanol crystals of $3\beta, 11\alpha, 14,21$-tetrahydroxy-14-isopregnanone-20-dibenzoate-3,11-acetate-21 (thick small discs) are obtained which melt at 142–150° C. The specific rotation of said compound is $[\alpha]_D^{18}: +12.4° \pm 1.5°$ (c.: 1.612 in CHCl$_3$).

430 mg. of said dibenzoate acetate (M. P. 130–140° C.) are dissolved in 5 cc. of pyridine. The pyridine solution is mixed with 1.2 g. of phosphorous oxychloride and a trace of water. The reaction mixture is allowed to stand at 60° C. for 3 days. Thereupon it is mixed with ice and extracted with ether.

From the ethereal solution there are isolated 355 mg. of $\Delta_{14,15}$-unsaturated dibenzoate acetate which are hydrogenated without further purification. They are dissolved in 10 cc. of acetic acid ethyl ester containing 0.2 cc. of glacial acetic acid. To this solution are added 40 mg. of platinum dioxide catalyst (PtO$_2$H$_2$O), hydrogen gas is passed through the mixture while shaking. 22.4 cc. of hydrogen are absorbed within 1¾ hours (calculated 21.4 cc.).

From the reaction mixture there are isolated 330 mg. of the crude $3\beta, 11\alpha, 21$-trihydroxypregnanone-20-dibenzoate-3,11-acetate 21. They are recrystallized from a mixture of ether and petroleum ether whereby 85 mg. of a crystalline product are obtained. This mother liquor and a second one from which 35 mg. of crystals are obtained are dissolved in 15 cc. of acetic acid ethyl ester and 0.5 cc. of glacial acetic acid; 40 mg. of the above mentioned platinum catalyst are added and the reaction mixture is hydrogenated for 5 hours whereby 54 cc. of hydrogen are absorbed. On working up the hydrogenation mixture 280 mg. of the saturated dibenzoate acetate are obtained.

365 mg. of said crude product (crystals and mother liquor product combined) are dissolved in 3 cc. of glacial acetic acid and mixed with 3 cc. of a 2% chromium trioxide solution in glacial acetic acid. The mixture is allowed to stand over night at room temperature.

From this mixture there are isolated 330 mg. of a purer product which, however, are further purified by chromatography on 10 g. of aluminum oxide.

The benzene-petroleum ether eluates, on evaporation, yield 150 mg. of a crude product having a very unsharp melting point. Fractions which are obtained by elution with benzene-petroleum ether and benzene alone, yield after recrystallization from acetone-petroleum ether 70 mg. of crystalline $3\beta, 11\alpha, 21$-trihydroxypregnanone-20-dibenzoate-3,11-acetate-21 which melt at 197–200° C. Its specific rotation is $[\alpha]_D^{18}: +34.6° \pm 2°$ (c.: 1.068 in CHCl$_3$).

I claim:

1. A $\Delta_{14,15}$-pregnene compound of the formula

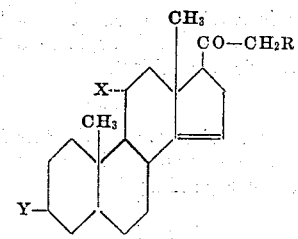

wherein X and Y are substituents selected from the group consisting of the hydroxyl group, a lower alkanoyloxy group, a carbo-(lower) alkoxy group, the benzoyloxy group, a lower alkoxy group, and the keto group, and R is the hydroxyl group and a lower alkanoyloxy group.

2. A $\Delta_{14,15}$-pregnene compound of the following formula

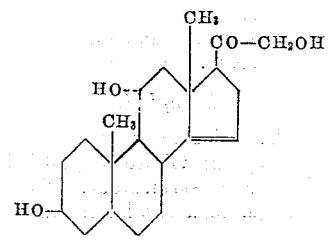

3. A $\Delta_{14,15}$-pregnene compound of the following formula

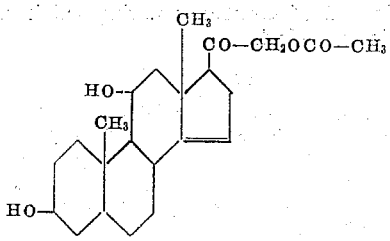

4. A $\Delta_{14,15}$-pregnene compound of the following formula

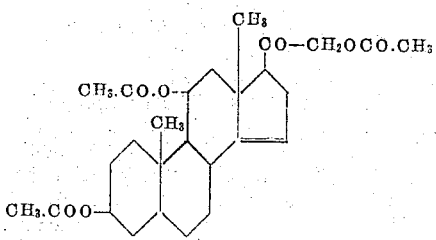

5. A $\Delta_{14,15}$-pregnene compound of the following formula

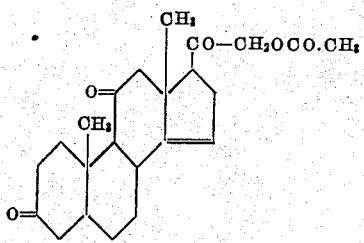

6. A Δ14,15-pregnene compound of the following formula

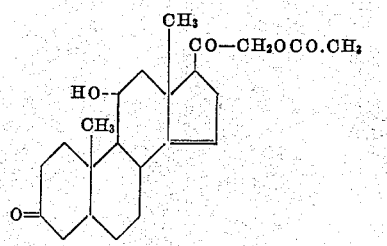

7. In a process of preparing adreno-cortical hormones characterized by a $C_{11}$-oxygen linkage, the steps comprising oxidizing by means of ozone compounds selected from the group of compounds consisting of sarmentogenine, sarmentocymarine, sarnovid, sarmentogenone, esters thereof with acids selected from the group consisting of lower alkanoic acids, lower alkoxy carbonic acids, the benzyloxy carbonic acid, and the benzoic acid, lower alkyl ethers thereof, and their glucosides, said compounds being characterized by (a) the presence of the typical A-, B-, C-, D-ring structure of cyclopentano dimethyl polyhydrophenanthrene compounds, (b) a fifth ring E having a double bond and being connected to the D-ring at the carbon atom 17, and (c) a hydroxyl group at the carbon atom 14, saponifying the resulting oxidation product and splitting off water from the resulting saponification product having a ketol group at the carbon atom 17, to form a double bond between the carbon atoms 14 and 15.

8. In a process of preparing adreno-cortical hormones characterized by a $C_{11}$-oxygen linkage, the steps comprising oxidizing sarmentogenine by means of oxidation agents, saponifying the resulting oxidation product, and splitting off water from the resulting saponification product having a ketol group at the carbon atom 17, to form a double bond between the carbon atoms 14 and 15.

9. In a process of preparing adreno-cortical hormones characterized by a $C_{11}$-oxygen linkage, the steps comprising oxidizing sarmentogenine by means of ozone to split the double bond in ring E thereof, saponifying the resulting oxidation product to produce a $C_{17}$-ketol compound, and dehydrating said ketol compound to eliminate the hydroxyl group at carbon atom 14, thereby forming a double bond between carbon atoms 14 and 15.

10. In a process of preparing adreno-cortical hormones according to claim 9, wherein the hydroxyl group at carbon atom 21 of the unsaturated ketol compound is selectively acylated to a lower alkanoyloxy group and the hydroxyl groups at carbon atoms 3 and 11 are oxidized to keto groups.

11. In a process of preparing adreno cortical hormones according to claim 7, wherein the hydroxyl group at carbon atom 21 of the resulting unsaturated ketol compound is selectively acylated to a lower alkanoyloxy group.

12. In a process of preparing adrenocortical hormones according to claim 11, wherein the hydroxyl groups at carbon atoms 3 and 11 of said acylated ketol compound are oxidized to keto groups.

No references cited.